United States Patent
Theobald et al.

(10) Patent No.: US 11,004,033 B1
(45) Date of Patent: May 11, 2021

(54) SYSTEM AND METHOD OF ASYNCHRONOUS AND AUTOMATED ORDER FULFILLMENT

(71) Applicant: Vecna Robotics, Inc., Cambridge, MA (US)

(72) Inventors: Daniel Theobald, Somerville, MA (US); Siddharth Ram Chhatpar, Winchester, MA (US)

(73) Assignee: VECNA ROBOTICS, INC., Waltham, MA (US)

(*) Notice: Subject to any disclaimer, the term of this patent is extended or adjusted under 35 U.S.C. 154(b) by 165 days.

(21) Appl. No.: 16/266,740

(22) Filed: Feb. 4, 2019

(51) Int. Cl.
  *G06Q 10/08* (2012.01)
  *G05D 1/02* (2020.01)
  *G05D 1/00* (2006.01)

(52) U.S. Cl.
  CPC ......... *G06Q 10/087* (2013.01); *G05D 1/0027* (2013.01); *G05D 1/0088* (2013.01); *G05D 1/0223* (2013.01); *G05D 2201/0216* (2013.01)

(58) Field of Classification Search
  CPC .. B65G 1/1373; B65G 1/1375; B65G 1/1376; B65G 1/1378; B65G 60/00; B25J 15/0616; B25J 15/065; B23Q 7/10; G06Q 10/08; G06Q 10/087; G06Q 50/12; G06K 2017/0051; H05K 13/021; H05K 13/0428
  USPC ....... 705/15, 28; 383/97, 120; 414/273, 280; 700/216, 231
  See application file for complete search history.

(56) References Cited

U.S. PATENT DOCUMENTS

| | | | | |
|---|---|---|---|---|
| 5,636,966 | A * | 6/1997 | Lyon | B65G 1/1378 414/791.6 |
| 6,377,867 | B1 * | 4/2002 | Bradley | B65G 1/1376 700/216 |
| 6,871,184 | B1 * | 3/2005 | Liberman | A47G 29/141 383/120 |
| 7,184,855 | B2 * | 2/2007 | Stingel, III | B65G 1/0464 414/789.6 |
| 7,331,471 | B1 * | 2/2008 | Shakes | B07C 7/005 209/630 |
| 8,326,452 | B2 * | 12/2012 | Somin | G06Q 10/087 700/216 |
| 9,751,693 | B1 * | 9/2017 | Battles | B25J 9/0093 |
| 9,802,761 | B2 * | 10/2017 | Buzan | B65G 1/0492 |
| 9,946,265 | B2 * | 4/2018 | Sullivan | B65G 1/0492 |
| 10,086,510 | B1 * | 10/2018 | McAninch | B25J 15/0052 |
| 10,155,623 | B2 * | 12/2018 | Conrad | B65G 1/0485 |
| 10,214,355 | B2 * | 2/2019 | Pankratov | B65G 1/1373 |
| 10,290,047 | B1 * | 5/2019 | Goyal | G06Q 30/0643 |
| 10,466,713 | B2 * | 11/2019 | Elazary | B65G 1/1375 |
| 10,521,767 | B2 * | 12/2019 | Pankratov | B65G 1/1373 |
| 10,549,928 | B1 * | 2/2020 | Chavez | B65G 47/905 |
| 10,589,932 | B1 * | 3/2020 | Theobald | B65G 1/0492 |
| 10,625,941 | B2 * | 4/2020 | High | G06K 7/1413 |
| 10,633,184 | B2 * | 4/2020 | Lert | B65G 1/1373 |
| 10,649,445 | B2 * | 5/2020 | Wagner | B65G 1/1373 |

(Continued)

*Primary Examiner* — Andrew Joseph Rudy

(57) ABSTRACT

Systems, methods, and computer-readable media are disclosed for fully automated order fulfillment. A method includes identifying a shelf tote having an item contained therein for transfer to an order tote; dispatching a first carrier to pick up the shelf tote and a second carrier to pick an order tote; causing the picker to pick the item from the shelf tote while the shelf tote is moving through the transfer station; and transferring the item to the order tote by the picker.

22 Claims, 7 Drawing Sheets

(56) References Cited

U.S. PATENT DOCUMENTS

| | | | |
|---|---|---|---|
| 10,703,567 B2* | 7/2020 | Grinnell | B25J 9/1679 |
| 10,706,587 B1* | 7/2020 | Sorgi | G06T 7/0004 |
| 10,752,442 B2* | 8/2020 | Shekhawat | B25J 9/1664 |
| 10,759,597 B2* | 9/2020 | Lindbo | G07F 11/165 |
| 10,875,721 B1* | 12/2020 | Chinoy | B65G 43/00 |
| 2018/0134492 A1* | 5/2018 | Lert, Jr. | G06Q 30/0643 |
| 2018/0374144 A1* | 12/2018 | Smilowitz | B07C 5/34 |
| 2020/0005319 A1* | 1/2020 | Scarborough | G06Q 20/40145 |
| 2020/0017317 A1* | 1/2020 | Yap | B65G 47/905 |

\* cited by examiner

SYSTEM AND METHOD OF ASYNCHRONOUS AND AUTOMATED ORDER FULFILLMENT

The present technology pertains to robotics and more specifically to a system and method of providing asynchronous order fulfillment through robotic retrieval and delivery of items.

BACKGROUND

With the ever expanding utilization of online commerce, merchants and sellers have set up warehouses where various products and items are shelved to be packed into orders as orders are received from some customers to be shipped out to the other customers. As the number of items and orders increase, automation becomes critical for businesses to be able to meet the customer demands and provide timely and satisfactory customer service.

What is needed is an improved system to efficiently automate and fulfill orders.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
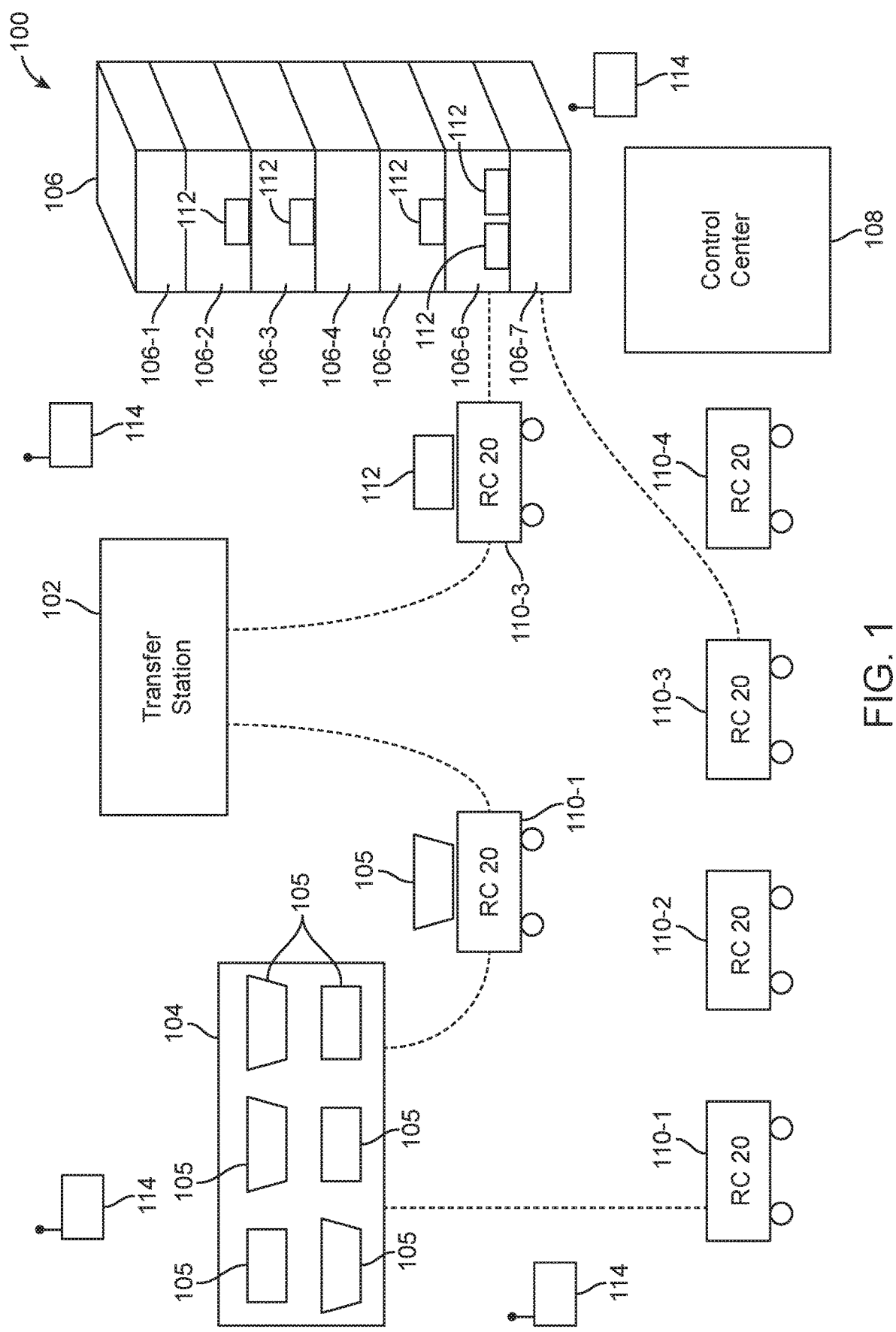
FIG. 1 illustrates an example warehouse setting, according to one aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For clarity of explanation, in some instances the present technology may be presented as including individual functional blocks including functional blocks comprising devices, device components, steps or routines in a method embodied in software, or combinations of hardware and software.

Overview

The present disclosure addresses the deficiencies in robotic retrieval and delivery systems which can be applicable to environments such as warehouses, hospitals, shopping centers and so forth. Specifically, the disclosed technology provides a fully automated system of components that operate asynchronously to fulfill orders through robotic retrieval and delivery of items.

In one aspect, a method includes identifying a shelf tote having an item contained therein for transfer to an order tote; dispatching a first robotic carrier to pick up the shelf tote and a second robotic carrier to pick an order tote, the first robotic carrier and the second robotic carrier travelling to a transfer station after picking up the shelf tote and the order tote; causing the picker to pick the item from the shelf tote while the shelf tote is moving through the transfer station; and transferring, in the transfer station, the item to the order tote by the picker.

In one aspect, a system for transferring items includes a first mobile robot configured to carry a shelf tote; a second mobile robot configured to carry an order tote; a transfer station having a picker with only two degrees of freedom, the only two degrees of freedom comprising a vertical direction and a horizontal direction, wherein the picker is used to pick an item from the shelf tote and deliver the item to the order tote at the transfer station; and a control system. The control system includes a computer-readable storage device storing instructions which, when executed by one or more processors, cause the one or more processors to dispatch the first mobile robot to pick up the shelf tote having the item therein; upon arrival of the first mobile robot, facilitate picking of the item by the at least one picker while the shelf tote is moving through the transfer station; and transfer, in the transfer station, the item to the order tote by the picker.

Detailed Description

The disclosure now turns to FIG. 1, which illustrates an example setting/environment in which fully automated robotic system of the present disclosure may be implemented. While FIG. 1 provides a warehouse setting as an example, the present disclosure and the systems described therein are not limited to warehouses but may be applicable to other settings such as hospitals, shopping centers, an education campus, a laboratory, an organization, a community/complex, etc.

FIG. 1 illustrates an example warehouse setting, according to one aspect of the present disclosure. As shown in FIG. 1, warehouse setting 100 or simply warehouse 100 can include a transfer station 102 where items picked from shelves are transferred to fulfill orders placed by users, customers, etc. Various examples of transfer station 102 will be described below with reference to FIGS. 2-5. While FIG. 1 illustrates a single transfer station 102 within warehouse 100, the present disclosure is not limited thereto and warehouse 100 can include any number of transfer stations similar to transfer station 102.

Warehouse 100 further includes an order tote rack 104, which may be picked up by an autonomous vehicle to be filled with items of an order in transfer station 102, as will be described below. Order tote rack 104 may have several empty totes 105 (trays 105 and/or order totes 105) placed therein (e.g., arranged in a shelve-like manner) to be picked up by an autonomous vehicle. While FIG. 1 illustrates an example number of 5 order totes 105, the present disclosure is not limited thereto.

Warehouse 100 further includes an items shelf 106, which may have several racks 106-1, 106-2, 106-3, 106-4, 106-5, 106-6 and 106-7. While FIG. 1 illustrates one item shelf 106 and 7 example racks therefore, the present disclosure is not limited thereto and warehouse 100 may include any number of item shelves such as items shelf 106, each of which may have more or less number of racks and/or items stored thereon.

On each rack of items shelf 106, there may be one or more shelf totes 112, each of which may have stored therein, one or more of a particular type of item or items that may be ordered by a customer, a user, etc. Shelf totes 112 may be organized according to the type of items they include such as in alphabetical order, etc.

Warehouse 100 further includes a control system 108, which may be communicatively (wired or wirelessly, as applicable) coupled to other components within warehouse 100 including but not limited to, transfer station 102 and components thereof, order totes 105 in tote rack 105, shelf totes 112, and robotic conveyors 110-1, 110-2, 110-3 and 110-4 (autonomous vehicles or robots 110-1, 110-2, 110-3 and 110-4). While not shown in FIG. 1, each such component of warehouse 100, as named above may include any known or to be developed communication component for being communicatively coupled to other components of warehouse 100 and/or control system 108. Example of such communication components include, but are not limited to, any short-range communication interface such as Bluetooth, WiFi, etc. Example components of control system 108 will be further described below with reference to FIG. 7.

In FIG. 1, control system 108 is shown to be in physical proximity of warehouse 100 (e.g., inside warehouse 100). However, the present disclosure is not limited thereto and control system may be remotely located relative to warehouse 100 and its components. For example control system 108 may be implemented and operate on a public, private and/or hybrid cloud and be accessible to components or operators of warehouse 100 via any known or to be developed wireless communication scheme.

Warehouse 100 further includes robotic conveyors (RC) 110-1, 110-2, 110-3 and 110-4, which may also be referred to as autonomous vehicles or robots such RC20 developed by Vecna Technologies. Hereinafter, RC20 is used as a non-limiting example of autonomous/robotic conveyors that may be utilized within warehouse 100. However, the present disclosure is not limited to RC20s.

Warehouse 100 may further include any necessary communication infrastructure including, but not limited to, access points 114 that may be installed throughout warehouse 100 to enable wireless (e.g., WiFi) communication between components of warehouse 100.

While it will be described in further detail below, FIG. 1 illustrates an example, where upon an order fulfillment request received at control system 108, control system 108 may direct one of RC20s such as RC20 110-1 to proceed to tote rack 104 to retrieve an order tote 105 to be filled with items associated with the order. Once picked up, order tote 105 and RC20 110-1 are directed to proceed to transfer station 102 for the items to be placed into order tote 105.

Prior to, simultaneous with or subsequent to the above process, control system 108 may also direct another RC20 such as RC20 110-3 to proceed to items shelf 106 and pick up an appropriate shelf tote 112 or shelf totes 112 that include the items associated with the order. In one example and when the order includes two or more items, control system 108 may direct a corresponding number of distinct RC20s to proceed to items shelf 106 so that each can pick up a different one of the items. In another example, all different items may be picked by the same RC20 such as RC20 110-3. Once picked up, shelf tote 112 and RC20 110-3 are directed to proceed to transfer station 102 for the item(s) to be transferred from shelf tote(s) 112 to order tote 105.

Figure 2:
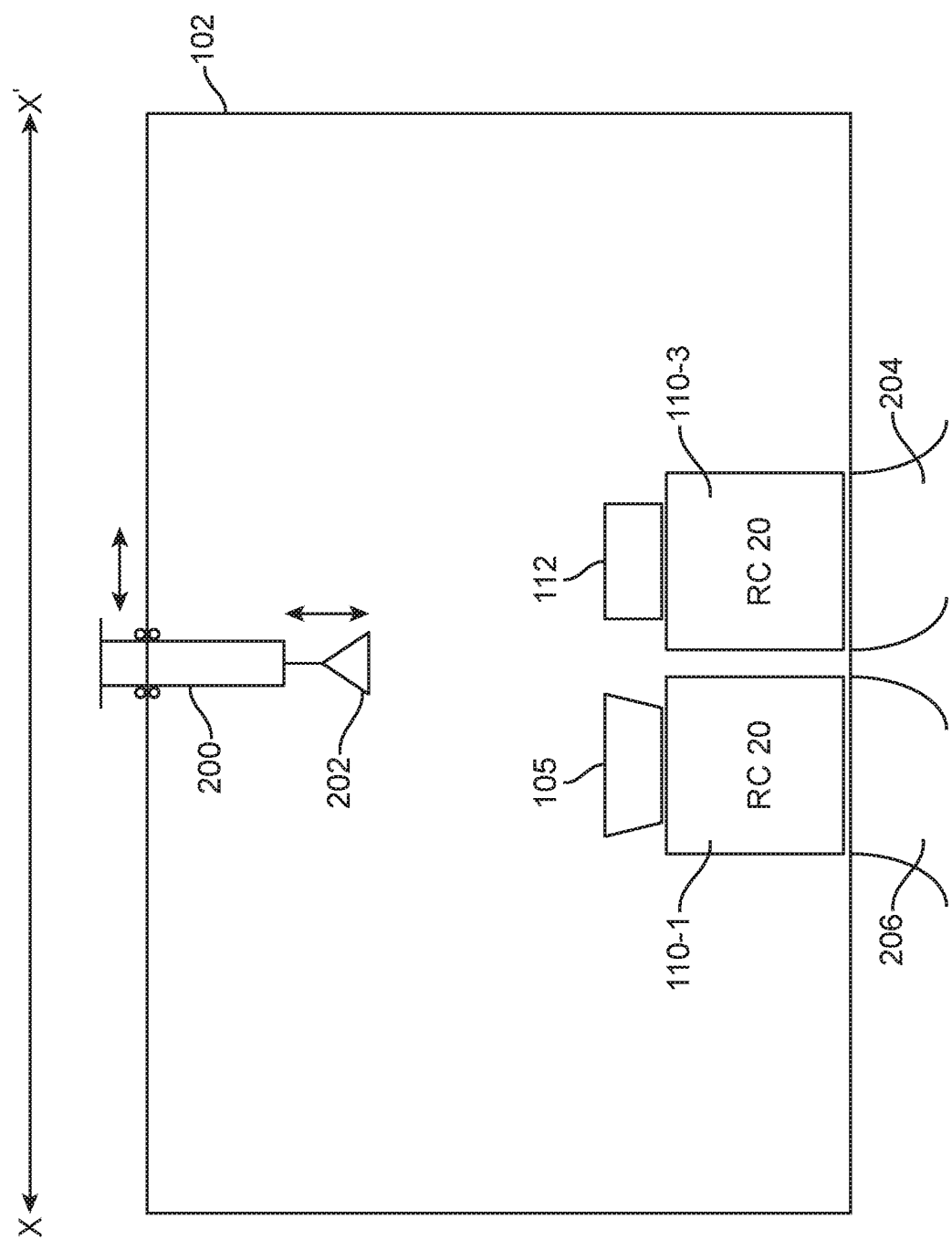
FIG. 2 illustrates an example transfer station of the warehouse setting of FIG. 1, according to one aspect of the present disclosure.

FIG. 2 illustrates an example transfer station of the warehouse setting of FIG. 1, according to one aspect of the present disclosure. FIG. 1 will be described with reference to FIG. 1 and therefore, for sake of brevity, components having same reference numerals as components in FIG. 1 will not be further described.

FIG. 2 illustrates a cross sectional view of inside transfer station 102 along the X-X' line. As shown, transfer station 102 can have a picker 200. In one example, picker 200 can have two degrees of freedom in movement. In other words, picker 200 can move vertically (up and down) or horizontally (left to right). Picker 200 also has a suction head 202 (which may also be referred to as gripper 202), which can be used to grab item(s) from shelf totes such as shelf tote 112 and place them inside order tote 105. The two degrees of freedom allows picker 200 to be directed to move down to reach a tote while at the same time, picker 200 can move sideways (left and right) to switch between shelf tote 112 and order tote 105.

FIG. 2 also illustrates two entrance paths 204 and 206 along which RC20 110-3 and RC20 110-1 can enter transfer station 102 and exit transfer station 102 from an opposite side (not shown). While FIG. 2 illustrates a single RC20 110-3 carrying a single shelf tote 112 and a single RC20 110-1 carrying a single order tote 105, the present disclosure is not limited thereto. There may be a number of RC20s lining up along paths 204 and 206, each carrying a shelf tote or an order tote, to be entered into transfer station 102 so that picker 200 can remove items with a corresponding shelf tote and place the same in an order tote carried by another RC20. In one example, there may not be a one to one correspondence between number of shelf tote carrying RC20s and order tote carrying RC20s entering and exiting reachable area of suction head 202. For example, an order tote may require several items, each of which may be carried in a different shelf tote. Therefore, while a single RC20 with such order tote may enter and remain in reachable area of suction head 202, multiple RC20s each carrying a different shelf tote that includes one of the several items required for the order, may enter the reachable area of suction 202, having the corresponding item removed and subsequently exit the reachable area of suction 202 and transfer station 102.

In one example, RC20 110-3 carrying shelf tote 112 may be travelling at a particular speed as RC20 110-3 as it enters and travels through transfer station 102. Control system 108, as will be described below, determines this particular speed and thus adjusts the speed at which picker 200 moves (vertically and/or horizontally) such that arrival of RC20 110-3 within reachable area of suction head 202 of picker 200 coincides with presence of suction head 202 in the same area such that suction head 202 can pick one or more items from shelf tote 112 followed by moving the same picked one or more items into an available order tote such as order tote 105. In other words, the adjustment of speeds may be such that RC20 110-3 may arrive within the reachable area of suction head 202, come to a complete stop, wait for suction head 202 to complete the process of picking the one or more items and then start moving again to exit transfer station 102.

In another example, when items are spread out within shelf tote 112, it may not be possible for picker 200 to pick the items of interest due to a limitation of movement of picker 200 to a vertical move or a horizontal move. Therefore, it may be possible to add a third degree of freedom (movement motion perpendicular to the vertical motion of picker 200) in order to allow suction head 202 to reach any item in shelf tote 112 regardless of the items position in shelf tote 112. In one example embodiment, this third degree of freedom may be provided by allowing small movements of RC20 110-3 within the reachable area of suction 202 as opposed to having RC20 110-3 come to a complete stop, as discussed above. In providing this third degree of freedom and movement, control system 108 may (1) control RC20 110-3 to move under picker 200 (within reachable area of suction head 202) at a sufficiently slow speed such that picker 200 can identify item(s) to be picked and (2) simultaneously control downward movement of picker 200 in harmony with slow speed of RC20 110-3 to pick the item(s).

Figure 3:
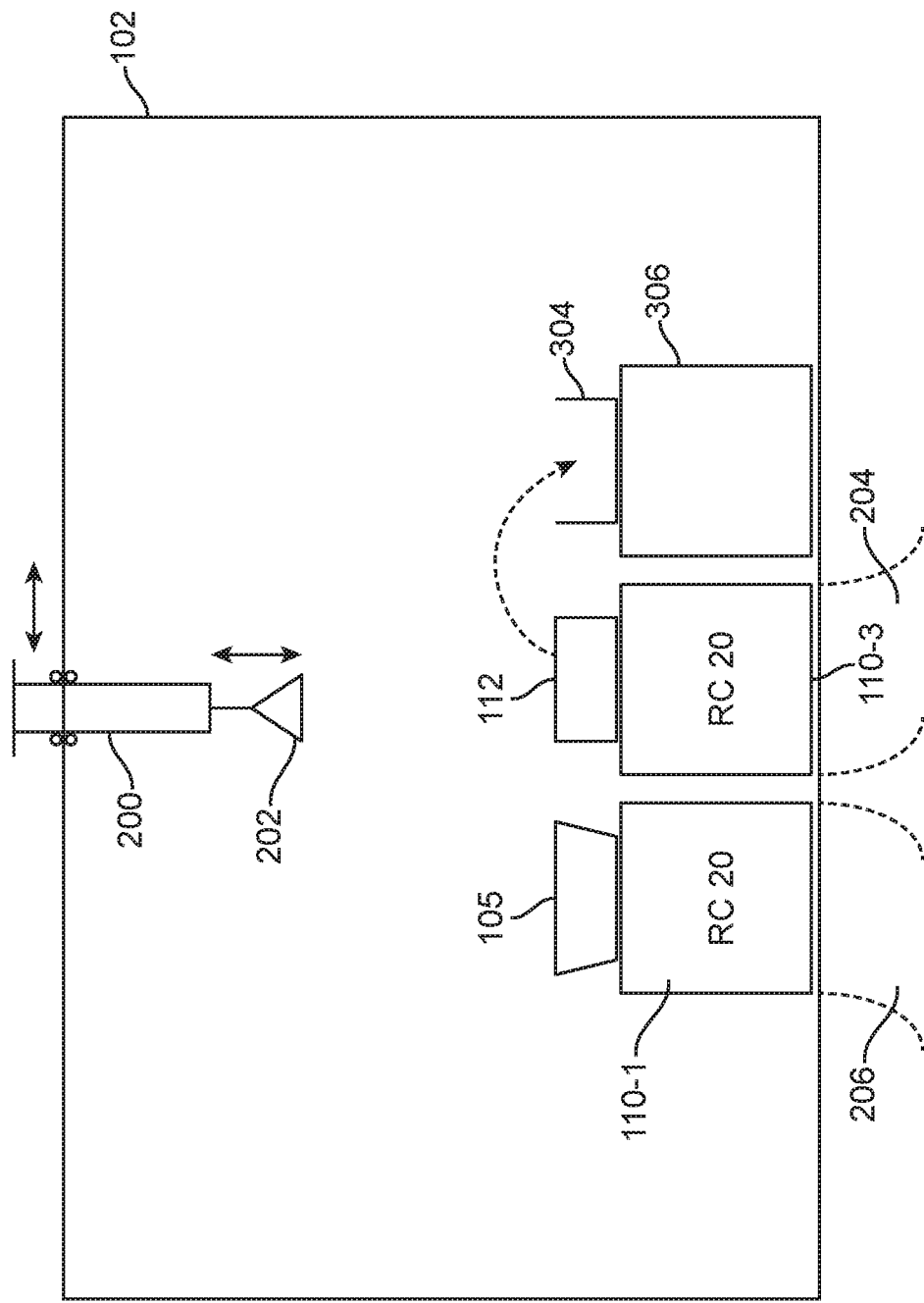
FIG. 3 illustrates an example transfer station of the warehouse setting of FIG. 1, according to one aspect of the present disclosure.

FIG. 3 illustrates an example transfer station of the warehouse setting of FIG. 1, according to one aspect of the present disclosure. FIG. 3 will be described with reference to FIGS. 1 and 2 and therefore, for sake of brevity, components having same reference numerals as components in FIGS. 1 and 2 will not be further described.

There may be situations where a merchant operating warehouse 100 may receive multiple orders for the same item. Therefore, it may be inefficient to simply pick a single one of the same item out of shelf tote 112 and transfer the same to order tote 105 and repeat the same for a number of order totes 105 corresponding to the number of multiple orders. Therefore, it may be advantageous to have a holding tray at transfer station 102 where upon arrival of shelf tote 112, picker 200 can pick several of the same item out of shelf tote 112 and place them in a holding tray. This may then be followed by picker 200 transferring one or more of the same item in the holding tray to any order tote 105 upon arrival within reachable area of suction head 202 inside transfer station 102.

FIG. 3 illustrates, in addition to components described above with reference to FIGS. 1 and 2, a holding tray 304 that may be positioned on a ledge 306. Ledge 306 may be movable or stationary. Regardless of whether ledge 306 is movable or stationary, ledge 306 may be positioned such that holding tray 304 falls within reachable area of suction head 202 for items to picked by suction head 202 and placed in holding tray 304.

While FIG. 3 illustrates a single holding tray 304 and associated ledge 306, the present disclosure is not limited thereto and there may be multiple holding trays on ledge 306 or each on a different ledge. Each holding tray may have multiple ones of a given item therein for subsequent fulfillment of corresponding orders.

Figure 4:
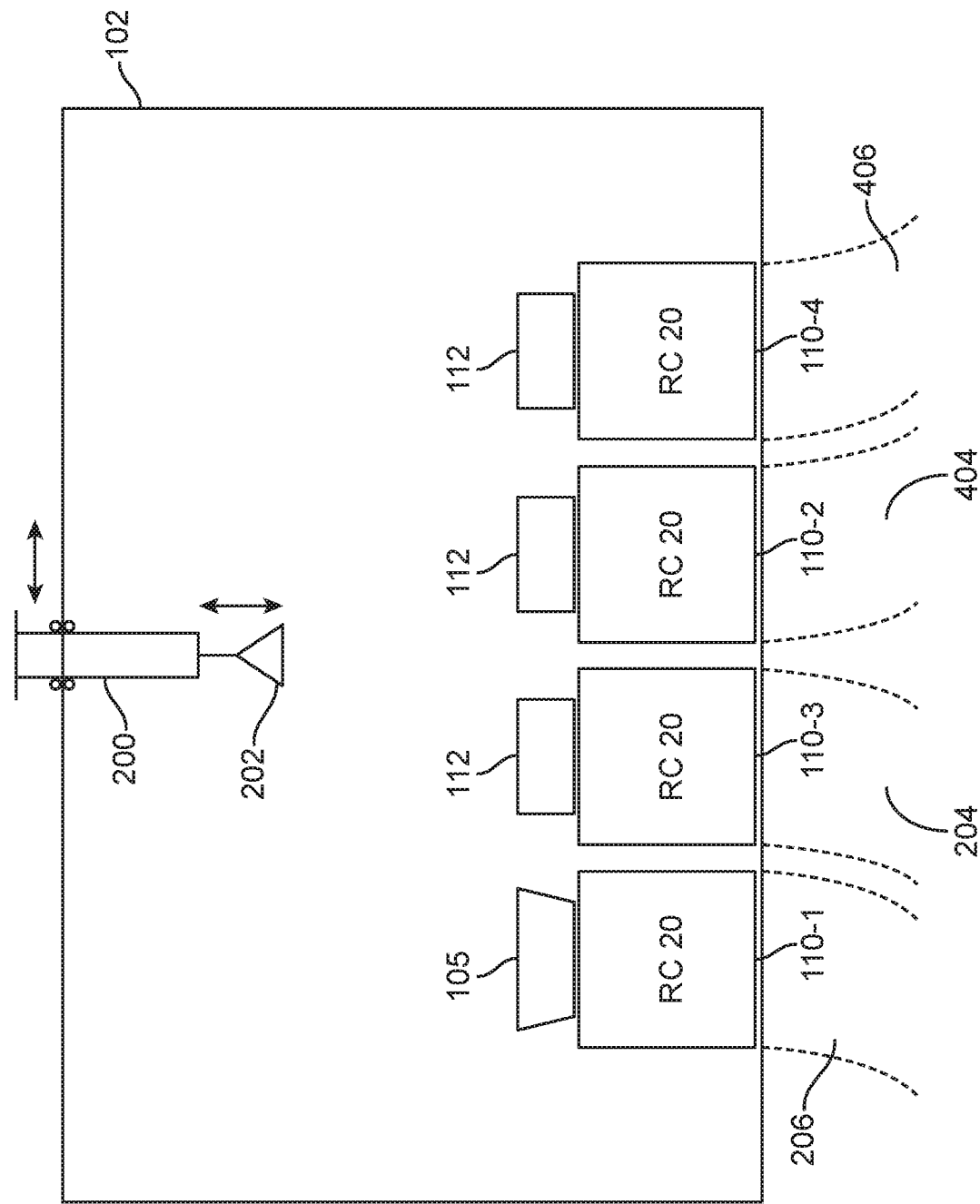
FIG. 4 illustrates an example transfer station of the warehouse setting of FIG. 1, according to one aspect of the present disclosure.

FIG. 4 illustrates an example transfer station of the warehouse setting of FIG. 1, according to one aspect of the present disclosure. FIG. 4 will be described with reference to FIGS. 1-3 and therefore, for sake of brevity, components having same reference numerals as components in FIGS. 1-3 will not be further described.

There may be situations where efficiency of order fulfillment may be increased by having multiple entrance/exit paths or tracks for shelf totes and order totes to enter transfer station 102. Accordingly, order fulfillment may be scaled up.

FIG. 4 illustrates, in addition to components described above with reference to FIGS. 1-3 including paths (tracks) 204 and 206, two additional example paths 404 and 406. The number of additional paths is not limited to those shown in FIG. 4, but may be more or less, subject to physical and structural limitations of transfer station 102.

In particular example of FIG. 4, paths 204, 404 and 406 are used by three RC20s 110-2, 110-3 and 110-4, respectively and as shown, to transport three shelf totes 112 inside transfer station 102, where each shelf tote 112 may have a particular item or type of item stored therein. Path 206 in FIG. 4 is used by RC20 110-1 to carry a single order tote 105. Specific example of FIG. 4 maybe one in which order tote 105 is to be filled with three different items and that control system 108 may control RC20 110-1, 110-2, 110-3 and 110-4 such that at a time of arrival of order tote 105 within reachable area of suction head 202, RC20s 110-2, 110-3 and 110-4 each carrying a separate shelf tote 112 that includes of the three items, arrive within the reachable area of suction head 202 so that suction head 202 can pick the three items from the three separate shelf totes 112 and place them inside order tote 105.

However, examples of a transfer station with multiple paths is not limited to that shown in FIG. 4 as paths may be used for any combination of different order totes 105 and shelf totes 112. For instance, in the example of FIG. 4, two of paths 204, 206, 404 and 406 may be used by two separate RC20s to bring two order totes 105 inside transfer station 102 while another two of paths 204, 206, 404 and 406 may be used for bringing two shelf totes 112.

In another example, three separate orders of the same item may be received. Therefore, control system 108 may control RC20s such that three RC20s such as RC20s 110-1, 110-2 and 110-3, may enter transfer station 102 using three of paths 204, 206, 404 and 406, each bringing a separate order tote 105 inside transfer station 102 and within reachable area of suction head 202 while another RC20 such as RC20 110-4 may use a remaining one of paths 204, 206, 404 and 406 to bring a shelf tote 112 that includes three counts of that same item. Thereafter, control system 108 can control picker 200 and suction head 202 to pick one count of the item from shelf tote 112 and place them inside a separate one of order totes 105.

In one example, transfer station 102 may include multiple pickers 200, which can be arranged horizontally adjacent to each other, in rows of pickers, etc., such that as multiple shelf totes 112 and/or multiple order totes 105 travel through transfer station 102, each arriving tote can be serviced by a different one of multiple pickers 200. Such arrangement of multiple pickers 200 may be such that movement of any individual one of pickers 200 does not interfere with the movement of any other one of pickers 200.

In another example, a single shelf tote 112 may have multiple items therein for multiple separate order totes 105 (can be multiple ones of the same item or multiple separate items). Accordingly, the single shelf tote 112 may travel through multiple ones of pickers 200 such that each picker 200 can pick one of the multiple items inside the shelf tote 112 and place them in the multiple separate order totes 105. Accordingly, the system efficiency may be increased.

Example structure of transfer station 102 as described with reference to FIG. 4 requires a relatively large horizontal movement of picker 200 along the X-X' line in order for suction head 202 to be able to reach within each shelf/order tote for picking/placing items therein. Furthermore, transfer station 102 may include more than the example four paths/tracks shown in FIG. 4, which translates into picker 200 requiring even greater horizontal movement along the X-X' line. As will be described below with reference to FIG. 5, in one example, use of chutes for order totes 105 eliminates this need of large horizontal movement.

Figure 5:
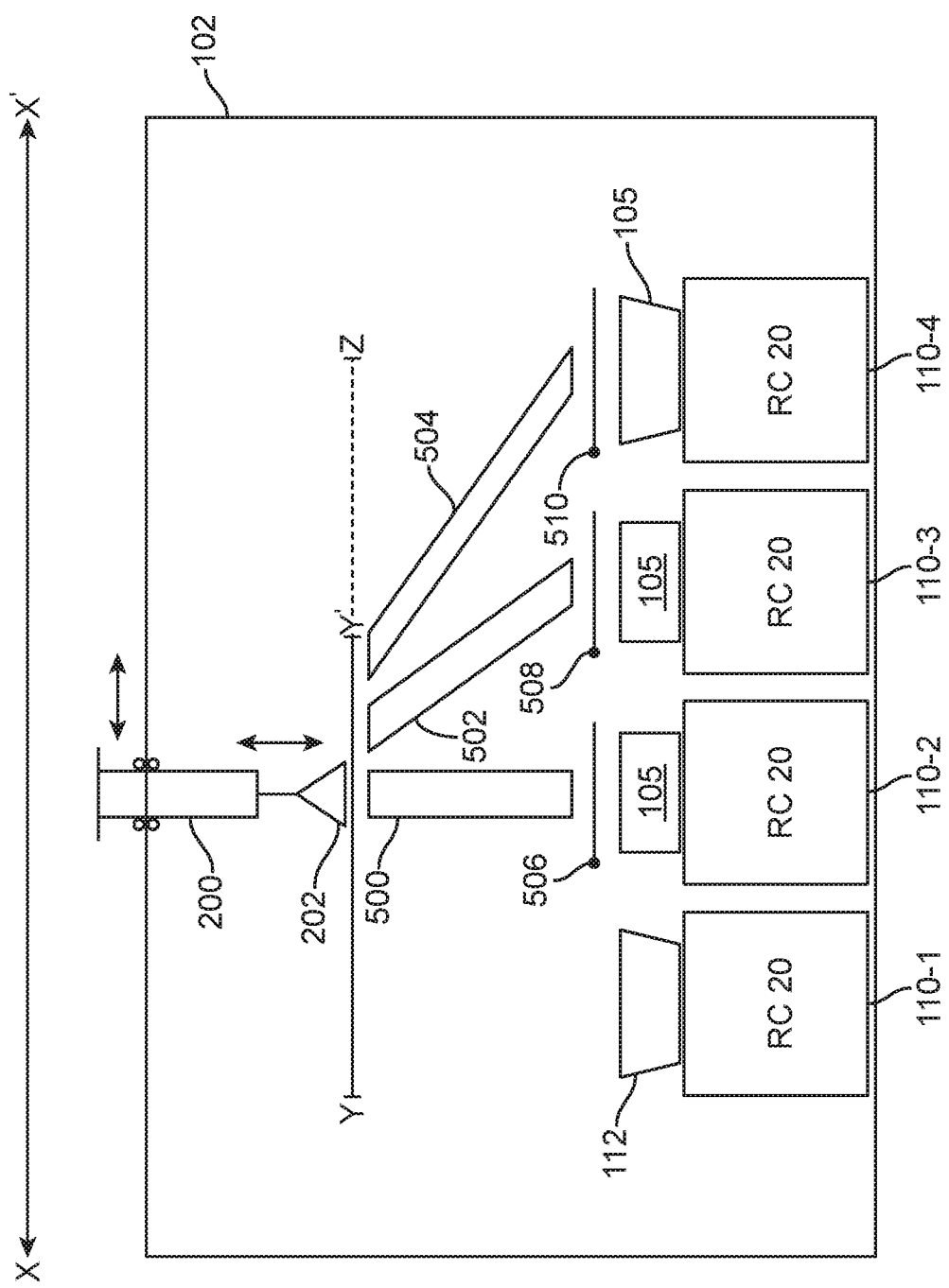
FIG. 5 illustrates an example transfer station of the warehouse setting of FIG. 1, according to one aspect of the present disclosure.

FIG. 5 illustrates an example transfer station of the warehouse setting of FIG. 1, according to one aspect of the present disclosure. FIG. 5 will be described with reference to FIGS. 1-4 and therefore, for sake of brevity, components having same reference numerals as components in FIGS. 1-4 will not be further described.

The example setup of FIG. 5 differs from that of FIG. 4 in that, in FIG. 5, three example RC20s 110-2, 110-3 and 110-4 each carry a separate order tote 105 inside transfer station 102 while RC20 110-1 carries a single shelf tote 105 inside transfer station 102 for items to be picked therefrom and placed into each of three order totes 105.

As shown in FIG. 5, transfer station 102 includes three chutes 500, 502 and 504. Chutes 500, 502 and 504 may be any known or to be developed chute made of any known or to be developed material such as plastic, metal, etc. Each of chutes 500, 502 and 504 may be of an appropriate length to allow a close enough reach to each order tote 105 at the lower end thereof such that items exiting a chute do not break upon impact inside an order tote.

In one example, chutes 500, 502 and 504 may be fixed in placement and length. In another example, chutes 500, 502 and 504 may be adjustable in numbers (chutes may be removed or added, as appropriate), placement and length to accommodate various types of RC20s, tote shapes and lengths, etc.

Upper opening of each of chutes 500, 502 and 504 may be within reachable area of suction head 202 in order for suction head 202 to be able to drop an items or items carried thereby, into one of chutes 500, 502 and 504.

At lower end of each of chutes 500, 502 and 504 there may be a gate such as gates 506, 508 and 510, respectively. In one example gates 506, 508 and 510 may have sensors associated therewith which allows for opening of each gate as items are dropped into chutes 500, 502 and 504, as a weight of an item is sensed on an upper surface of each gate, etc. In another example, gates 506, 508 and 510 may be gates (made of plastic, metal, etc.) that simply open when an item reaches an upper surface thereof and allow for the item to drop into a corresponding one of order totes 105. In another example and for safety reasons, gates 506, 508 and 510 may be controllable to be locked so that at designated times no item may be dropped therethrough into totes, on the floor, etc.

By employing non-limiting and example configuration of FIG. 5 and chutes described with respect to FIG. 5, horizontal movement of picker 200 is limited to example range Y-Y' as opposed to Y-Z, if chutes are not used.

Having described various examples of warehouse 100 and transfer station 102, the disclosure now turns to description of example methods of operating components of warehouse 100 including RC20s, order totes 105, shelf totes 112 and picker 200 by control system 108.

Figure 6:
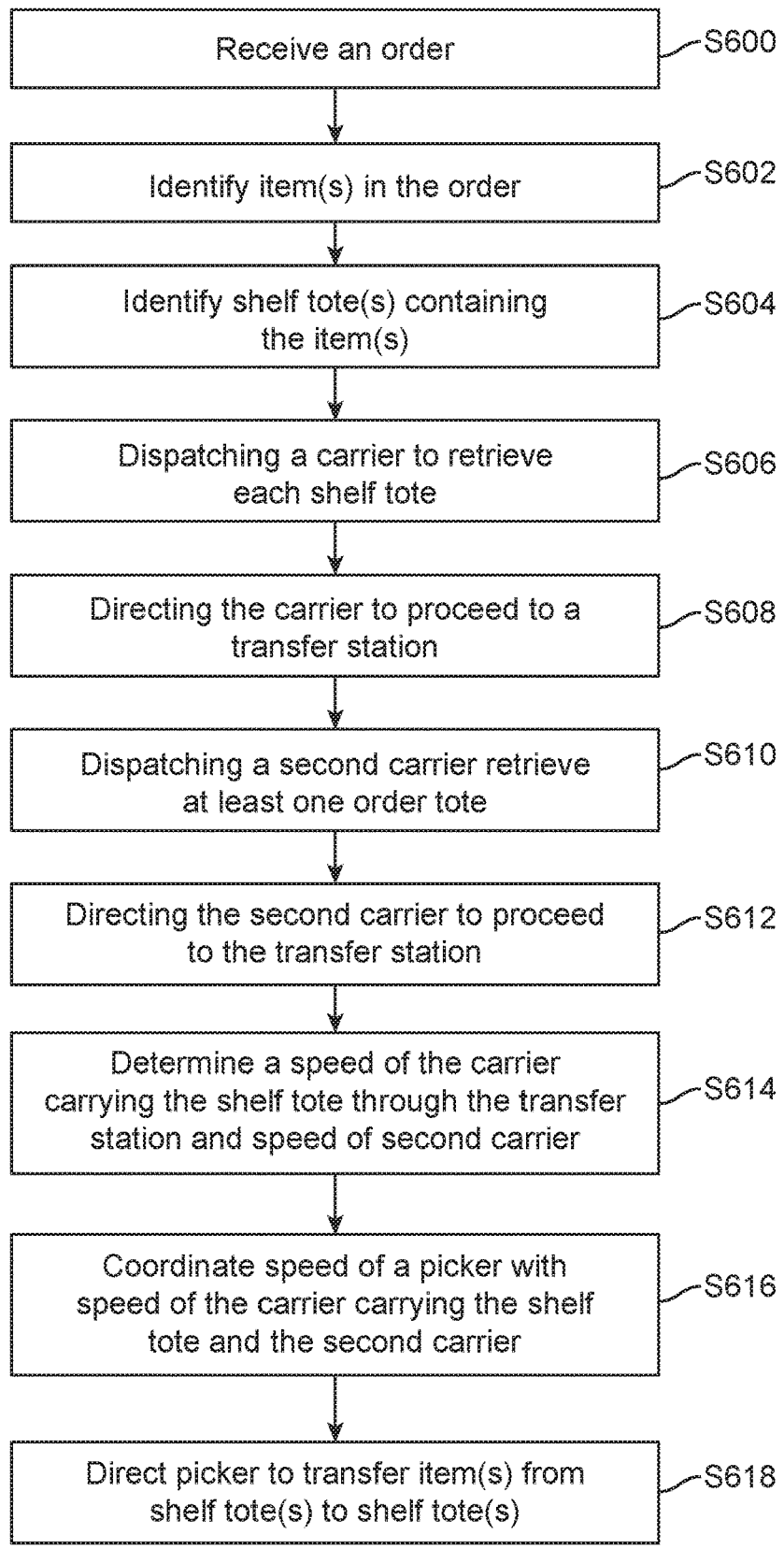
FIG. 6 illustrates an example method of order management within the warehouse setting of claim 1, according to one aspect of the present disclosure.

FIG. 6 illustrates an example method of order management within the warehouse setting of claim 1, according to one aspect of the present disclosure. FIG. 6 will be described from the perspective of control system 108. However, it will be understood that control system 108 has components (as will be described below with reference to FIG. 7) such as memories and processors that allow for execution of computer-readable instructions to implement the functionalities described below with reference to FIG. 6. Furthermore, FIG. 6 will be described with reference to FIGS. 1-5.

At S600, control system 108 receives an order. An order may be placed online via a website operated by a merchant associated with warehouse 100, at a point of sale terminal at a physical location of a merchant associated with warehouse 100, etc. The order may be received at one or more servers of control system 108. The order may have one or more associated items. Examples of items include, but are not limited to, clothing articles, food, furniture, electronic equipment, appliances, etc.

At S602, control system 108 may identify one or more items that are associated the order.

At S604, control system 108 may identify item shelves such as item shelf 106 that have the one or more items stored thereon. The one or more items may be stored on different item shelves and/or different racks thereof. In one example, each item may have a barcode associated therewith that may be scanned upon placement thereof in a particular item shelf and a particular rack thereof. Accordingly, control system 108 may have a registered location associated with each item stored in shelves and racks. By referencing a table of records or a database of item locations, control system 108 can identify and locate each item associated with the order.

At S606, control system 108 may dispatch one or more carriers (autonomous vehicles or transporters) such as one or more of RC20s 110-1, 110-2, 110-3 and 110-4 to item shelves on which the one or more items are stored. The dispatched carriers may be referred to as one or more first carriers or first mobile carriers. In one example, a separate carrier may be dispatched to a location of each of the items associated with the order, assuming the order includes more than one item. In another example, a single carrier can be dispatched to the location of all the items to pick them up.

Within warehouse 100, routes to be traveled between various locations may be programmed and stored on each carrier and may be frequently updated by control system 108. Accordingly, by sending the destination information (e.g., item shelf identification or location within warehouse 100), control system 108 can command the one or more carriers to proceed to the location of interest to pick up items.

As noted above, items are stored on the item shelves in shelf totes such as shelf totes 112. Each shelf tote may have stored therein one or more of the same type of item. Therefore, upon arrival at an appropriate item shelf such as item shelf 106, RC20 such as RC20 110-3 may either move up and down vertically to reach a rack on which a shelf tote carrying the item of interest is stored to retrieve the corresponding shelf tote 112. In another example, there may be an automatic handler at item shelf 106, which upon arrival of RC20 110-3 may receive a command indicating the rack on which the shelf tote carrying the item of interest is stored. In response, the automatic handler may move vertically to obtain the shelf tote and transport the same to RC20 110-3 and place it on top of RC20 110-3. At this point RC20 110-3 is loaded.

Thereafter and upon receiving an indicated of loaded RC20 110-3, at S608, control system 108 may direct the loaded RC20 110-3 (or direct multiple loaded RC20s each carrying a shelf tote having a given one of items of interest therein) to proceed to transfer station 102.

At S610, control system 108 may direct a separate carrier such as RC20 110-1 (which may be referred to as second carrier or second mobile carrier) to proceed to tote rack 104 to remove an empty tote rack 105 for receiving item(s) being carried by one or more first carriers (e.g., RC20 110-3) at transfer station 102. In one example and depending on the number of items associated with an order, more than one order tote may be necessary to collect all the items. Accordingly, control system 108 may order two or more RC20s to simultaneously or consecutively (within a specified period of time) to proceed to pick an empty order tote 105 and travel to transfer station 102 to receive the items.

At S612, control system 108 directs the second carrier to transfer station 102.

At S614, control system 108 may determine a speed at which first carrier (e.g., RC20 110-3 carrying a shelf tote 112) and/or second carrier (e.g., RC20 110-1 carrying an order tote 105) enter and travel through transfer station 102. For example, control system 108 may determine that RC20 110-3 is travelling at speed of 5 miles/hour upon entrance into transfer station 102.

At S616, control system 108 may adjust movement of picker 200 (e.g., horizontal and/or vertical speed of picker 200) to coordinate speed of picker 200 with speed of RC20 110-3 or speed of RC20 110-1 such that suction head 202 is able to pick an item from shelf tote 112 exactly at a time at which RC20 110-3 arrives and stops under (within reachable area) of suction head 202 and/or is able to drop a picked item into order tote 105 exactly at a time at which RC20 110-1 arrives or stops under (within reachable area) of suction head 202. In other words, control system 108, at S616, may align picker 200 with RC20 110-3 and/or RC20 110-1.

At S618 and based on the adjusted movements, control system 108 may direct picker 200 to pick an item from shelf tote 112 and/or to drop a picked item into order tote 105 in order to fulfill the order received at S600. In one example, suction head 202 may utilize any known or to be developed visual image recognition method to pick an item of interest from a shelf tote. For example, picker 200 can have any known or to be developed vision system, which can be utilized during vertical movement of picker 200 to adjust the position and/or movement of picker 200 for picking an item from shelf tote 112 and/or placing an item inside order tote 105. Such vision system may be mounted adjacent to or embedded with head 202 of picker 200. Accordingly, picker 200 with a vision system may be referred to as a smart picker.

In another example, picker 200, instead of or in addition to the above vision system, may be equipped with multiple suction heads (grippers) 202, which can move over a shelf tote 112 and attempt a pick of an item. For example, when there are multiple items in shelf tote 112, each one of such multiple suction heads 202 may attempt to grab/pick one of the multiple items in shelf tote 112. Control system 108 may utilize an independent vision system or the vision system mounted on picker 200 to determine which of the multiple items picked by multiple suction heads 202 may be retained, dropped back into shelf tote 112, etc. (e.g., based on a number of order totes 105 for a particular item).

In one example, transfer station 102 may be equipped with multiple pickers 200, one or more of which may be pickers with multiple suction heads, while one or more of pickers 200 may be equipped with a single suction head 202. Accordingly, control system 108 may control shelf totes 112 such that any shelf tote 112 with multiple items (or more than a threshold number of items such as 3 or 4 items) may be directed or positioned under one of the multiple pickers 200 with multiple suction heads 202 while shelf totes 112 with a single item (or less than threshold number of items such as 3 or 4 items). In other words, control system 108 may determine which picker 200 an arriving shelf tote may be directed toward for picking item(s) included therein, based on the number of items in each arriving shelf tote.

While at S614, S616 and S618, examples are described where speed at which shelf tote 112 and picker 200 move to enable picking of an item or items from shelf tote 112, the present disclosure is not limited to this concept. In one example, control system 108 may detect presence of shelf tote 112 inside transfer station 102, position shelf tote 112 to under picker 200 followed by directing picker 200 to move vertically to pick the item of interest. In another example, control system 108 may also, after positioning shelf tote 112 under picker 200, direct shelf tote 112 to move back and forth (and/or left and right) in order to enable picker 200 to pick the item(s) inside shelf tote 112, thus providing an additional degree of freedom to picker 200 for picking the item(s).

In one example, inside transfer station 102, tracks/paths 204 and 206 may be adjacent to each such that RC20 110-1 and RC20 110-3 carrying an order tote and a shelf tote respectively, may arrive in reachable area of suction head 202 in adjacent with one another and avoid any accidental drop of an item picked by suction 202 from shelf tote 112 anywhere other than inside order tote 105.

While FIG. 6 describes an example method of picking a single item from a shelf tote 112 or dropping a single item into an order tote 105, the present disclosure is not limited to. Method of claim 6, can be easily expanded to accommodate any of the example scenarios with respect to FIGS. 2-5. For example, speed of picker 200 may be adjusted to accommodate picking up items from more than one shelf tote or dropping items in more than one order tote.

Having described various example setups and methods of automated order fulfillment with reference to FIGS. 1-6, the disclosure now turns to description of example components of control system 108 that enable management and control of automated order fulfillment.

Figure 7:
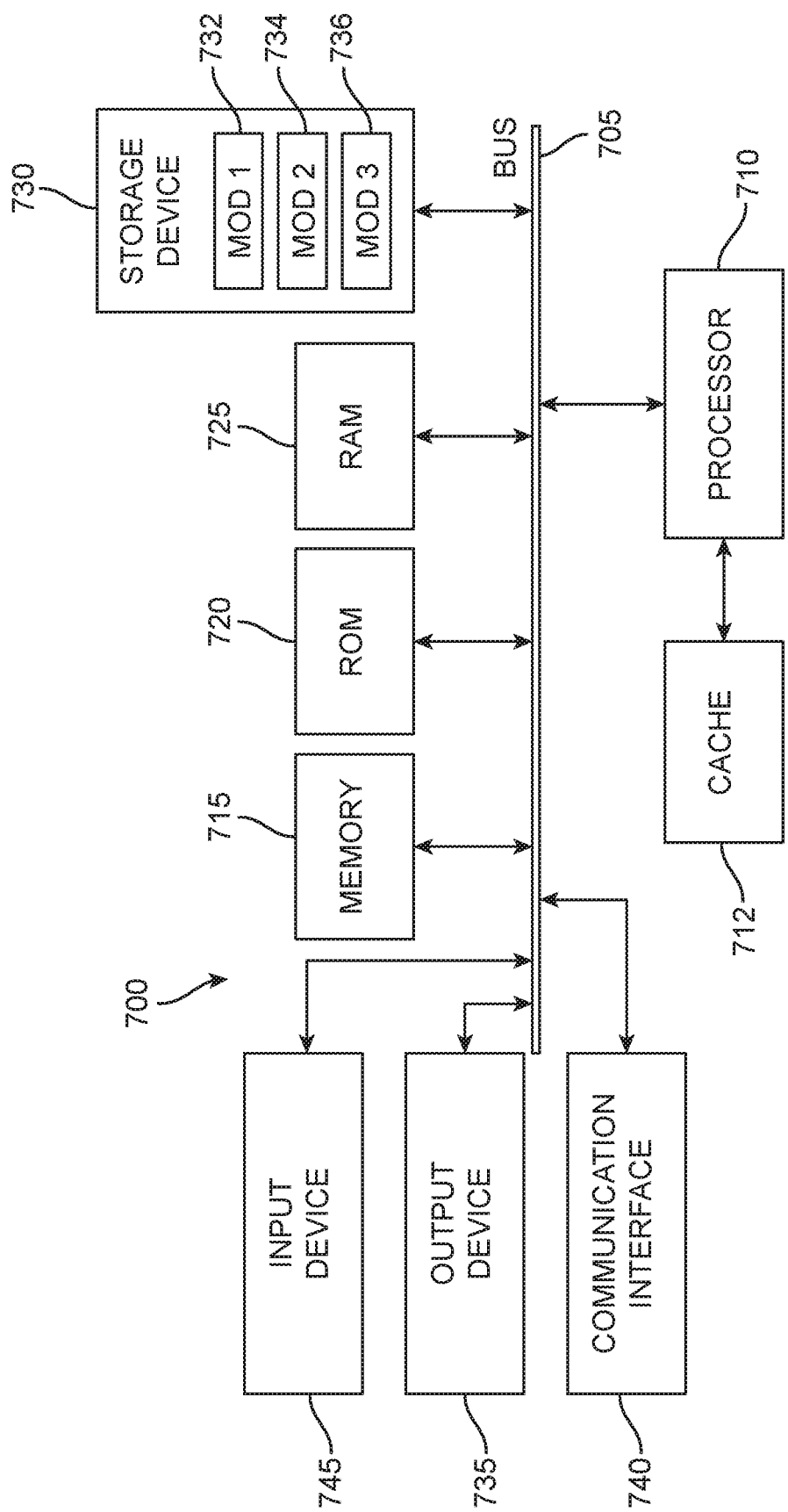
FIG. 7 illustrates example components of a controller managing operations of the warehouse setting of FIG. 1, according to one aspect of the present disclosure.

FIG. 7 illustrates example components of a controller managing operations of the warehouse setting of FIG. 1, according to one aspect of the present disclosure.

In this example, FIG. 7 illustrates a computing system 700 (system 700) including components in electrical communication with each other using a connection 705, such as a bus. System 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
identifying a shelf tote having an item contained therein for transfer to an order tote;
dispatching a first robotic carrier to pick up the shelf tote and a second robotic carrier to pick up the order tote, the first robotic carrier and the second robotic carrier travelling to a transfer station after picking up the shelf tote and the order tote;
causing a picker at the transfer station to pick the item from the shelf tote while the shelf tote is moving through the transfer station; and
transferring, by the picker in the transfer station, the item to the order tote.

2. The method of claim 1, wherein causing the picker to pick the item from the shelf tote comprises:
determining a speed of the shelf tote as it moves through the transfer station;
coordinating a vertical speed of the picker based on the speed of the shelf tote to yield a chosen picker vertical speed; and
causing the picker to pick the item from the shelf tote based on the chosen picker vertical speed.

3. The method of claim 1, further comprising:
determining whether multiple picks from the shelf tote by the picker are required while the shelf tote is in the transfer station to yield a determination;
when the determination indicates that multiple picks are required, adjusting a speed of the shelf tote to yield a slower shelf tote speed; and
while the shelf tote is moving through the transfer station at the slower shelf tote speed, picking the item from the shelf tote.

4. The method of claim 1, wherein at least one of the shelf tote and the order tote does not stop as it moves through the transfer station.

5. The method of claim 1, wherein
the transfer station includes multiple pickers;
one or more of the multiple pickers has multiple suction heads for picking items from shelf totes, and
the method further comprises:
determining a number of items in the shelf tote; and
directing the shelf tote to one of the multiple pickers with the multiple suction heads or one of the multiple pickers with a single suction head depending on the number of the items in the shelf tote.

6. The method of claim 1, further comprising:
receiving a visual configuration of the item in the shelf tote; and
picking the item from the shelf tote based at least in part on the visual configuration of the item in the shelf tote.

7. The method of claim 1, wherein a speed of the shelf tote is one of a standardized speed of all shelf totes moving through the transfer station or an assigned speed of a respective shelf tote moving through the transfer station.

8. The method of claim 1, wherein a speed of the shelf tote is assigned based on a configuration of one or more items contained within the shelf tote.

9. The method of claim 1, further comprising:
before transferring, in the transfer station, the item to the order tote by the picker, transferring the item to a holding tray in the transfer station, wherein transferring the item to the order tote by the picker comprises transferring the item from the holding tray to the order tote.

10. The method of claim 1, wherein the transfer station comprises a single lane for the shelf tote and multiple lanes in parallel for multiple order totes to each receive a respective item as picked by the picker from the shelf tote.

11. The method of claim 10, wherein the transfer station comprises multiple chutes which enable the picker to retrieve the item from the shelf tote and to select one of the multiple chutes for delivery of the item to a respective order tote associated with a respective chute of the multiple chutes.

12. The method of claim 11, wherein each respective chute of the multiple chutes comprises a gate such that asynchronous picking and delivery of the item can occur between the shelf tote and a respective order tote.

13. A system for transferring items, the system comprising:
a first mobile robot configured to carry a shelf tote;
a second mobile robot configured to carry an order tote;
a transfer station having at least one picker with only two degrees of freedom, the only two degrees of freedom comprising a vertical direction and a horizontal direction, wherein the at least one picker is used to pick an item from the shelf tote and deliver the item to the order tote at the transfer station; and
a control system comprising a computer-readable storage device storing instructions which, when executed by one or more processors, cause the one or more processors to:
dispatch the first mobile robot to pick up the shelf tote having the item therein;
upon arrival of the first mobile robot, facilitate picking of the item by the at least one picker while the shelf tote is moving through the transfer station; and
transfer, by the picker in the transfer station, the item to the order tote.

14. The system of claim 13, wherein the computer-readable storage device stores additional instructions which, when executed by the one or more processors, cause the one or more processors to:
determine a speed of the shelf tote as it moves through the transfer station;
coordinate a vertical speed of the at least one picker based on the speed of the shelf tote to yield a chosen picker vertical speed; and
cause the at least one picker to pick the item from the shelf tote based on the chosen picker vertical speed.

15. The system of claim 14, wherein the computer-readable storage device stores additional instructions which, when executed by the one or more processors, cause the one or more processors to:
determine whether multiple picks from the shelf tote by the at least one picker are required while the shelf tote is in the transfer station to yield a determination;
upon determining that multiple picks are required, adjust the speed of the first mobile robot to yield a speed; and
while the shelf tote is moving through the transfer station at the speed, pick the item from the shelf tote.

16. The system of claim 13, wherein a speed of the first mobile robot is one of a standardized speed of all shelf totes moving through the transfer station or an assigned speed of a respective mobile robot moving through the transfer station.

17. The system of claim 13, wherein a speed of the first mobile robot is assigned based on a configuration of one or more items contained within the shelf tote.

18. The system of claim 13, wherein the computer-readable storage device stores additional instructions which, when executed by the one or more processors, cause the one or more processors to:
before transferring, in the transfer station, the item to the order tote by the picker, transfer the item to a holding tray in the transfer station, wherein transferring the item to the order tote by the picker comprises transferring the item from the holding tray to the order tote.

19. The system of claim 13, wherein the transfer station comprises a single lane for the shelf tote and multiple lanes in parallel for multiple order totes to each receive a respective item as picked by the at least one picker from the shelf tote.

20. The system of claim 19, wherein the transfer station comprises multiple chutes which enable the at least one picker to retrieve the item from the shelf tote and to select one of the multiple chutes for delivery of the item to a respective order tote associated with a respective chute of the multiple chutes.

21. The system of claim 20, wherein each respective chute of the multiple chutes comprises a gate such that asynchronous picking and delivery of the item can occur between the shelf tote and a respective order tote.

22. The system of claim 13, further comprising multiple pickers, wherein
one or more of the multiple pickers has multiple suction heads for picking items from shelf totes, and
the computer-readable storage device stores additional instructions which, when executed by the one or more processors, cause the one or more processors to:
determine a number of items in the shelf tote; and
direct the shelf tote to one of the multiple pickers with the multiple suction heads or one of the multiple pickers with a single suction head depending on the number of the items in the shelf tote.

\* \* \* \* \*